Figure 1:
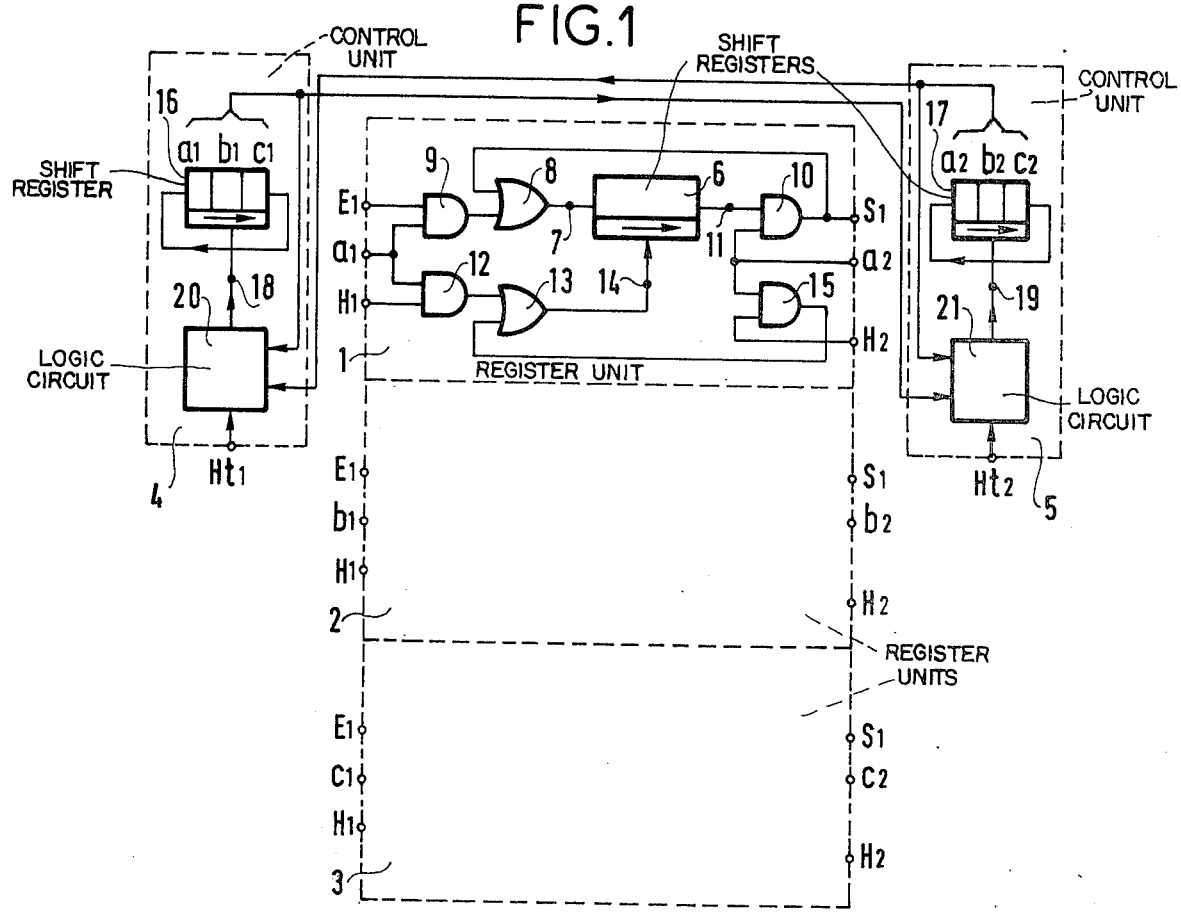

United States Patent [19]

Luder

[11] 4,121,057

[45] Oct. 17, 1978

[54] FRAME SYNCHRONIZING DEVICE

[75] Inventor: Jacques Luder, Ris-Orangis, France

[73] Assignee: Societe Anonyme dite Compagnie Industrielle des Telecommunications Cit-Alcatel, Paris, France

[21] Appl. No.: 821,220

[22] Filed: Aug. 2, 1977

[30] Foreign Application Priority Data

Aug. 20, 1976 [FR] France .................................. 76 25345

[51] Int. Cl.² .............................................. H04J 3/06
[52] U.S. Cl. ................................ 179/15 BS; 178/69.1
[58] Field of Search ............ 179/15 BS, 170.2, 170.6; 178/69.1

[56] References Cited

U.S. PATENT DOCUMENTS

| 4,002,845 | 1/1977 | Kaul et al. ........................ 179/15 BS |
| 4,004,100 | 1/1977 | Takimoto ......................... 179/15 BS |
| 4,045,618 | 8/1977 | Lagarde et al. .................. 179/15 BS |

Primary Examiner—Thomas W. Brown
Attorney, Agent, or Firm—Roland Plottel

[57] ABSTRACT

The invention relates to the frame synchronization of a first binary pulse train with a second binary pulse train. According to the invention, three looped shift registers are provided which each have a capacity of one complete frame and two identical control circuits are provided which cyclically respectively connect the input and output of the device to the inputs and outputs of the registers. In the case of divergence of frequencies between the two pulse trains, one complete frame is either repeated twice or completely omitted.

6 Claims, 2 Drawing Figures

FRAME SYNCHRONIZING DEVICE

The invention relates to the problem of "frame" synchronisation of a first data pulse train at a bit rate H1 with a second data pulse train at a bit rate H2.

If it is required to process several binary data trains simultaneously, one of the trains must be submitted to a synchronisation in such a way that its "frame" structure coincides with that of the other trains.

In the prior art, this problem has been solved in several ways. A first way consists in providing a random access memory into which one of the pulse trains is loaded at the rate of that pulse train and which is unloaded under the control of the clock of the other pulse train. The memory has capacity for storing at least one complete frame and it is associated with two control circuits respectively for loading and unloading. Such a device has several defects:

a — It is necessary to determine the bit position of the processed frame so as to be able to address the memory, b — A coincidence must be avoided between a loading operation and an unloading operation, especially if these two operations relate to the same cell of the memory;

c — The device is not symmetrical, i.e. it does not also ensure, where necessary, synchronisation of the second pulse train with the first, and d — The checking of such a system is difficult, because each point of the memory is associated with a particular binary position in the frame. It is therefore necessary to send a test signal to all the cells of the memory. This can be done only during maintenance.

Another previous solution makes use of a memory known as a FIFO memory (a "first-in-first-out" memory). This solution distinguishes itself from the above-described solution only by the fact that the addressing means are replaced by memory shift control means. The conflict between loading and unloading must be resolved in the same way as previously.

Preferred embodiments of the invention mitigate the above-mentioned drawbacks. The present invention provides a device for synchronising a "frame" of a first data pulse train at a first bit rate to a second data pulse train at a second bit rate, the device comprising a memory, and first and second control circuits for activating respectively the loading of the memory in synchronism with "frame" pulses of the first pulse train, and the unloading of the memory in synchronism with "frame" pulses of the second pulse train; wherein the memory is constituted by three looped shift register units, each having a capacity of one complete frame, and wherein the two control circuits have identical structures and cyclically connect the input of the device to the inputs of the shift registers and likewise cyclically connect the outputs of the shift registers to the output of the device in such a way that each of the control circuits switches from one register unit to the next only if that next unit is not already activated at the switching instant by the other control circuit.

Figure 2:
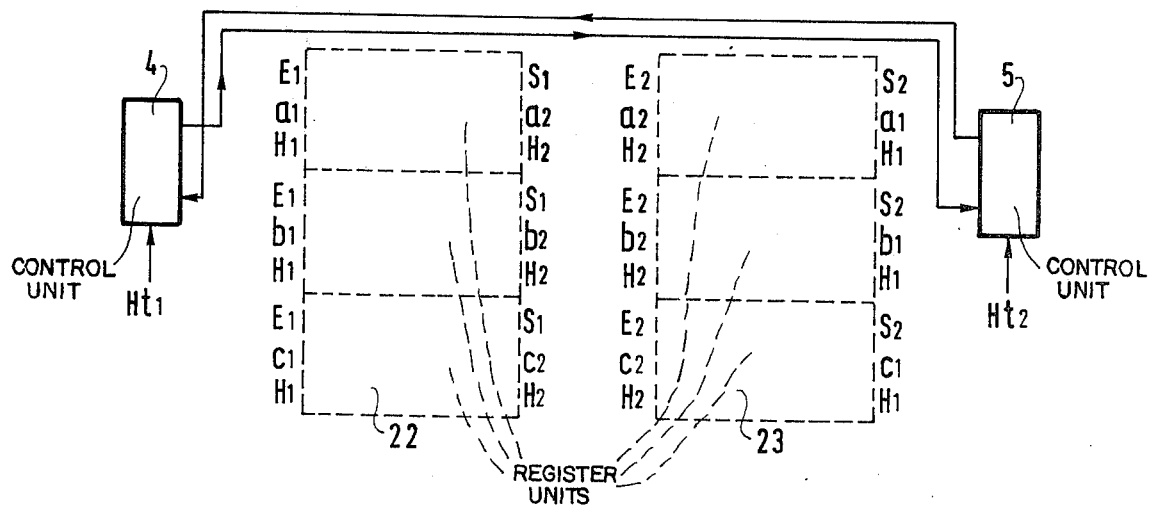

Embodiments of the invention will be described hereinbelow by way of example with reference to the accompanying drawing in which:

FIG. 1 shows schematically a preferred example of the invention for the synchronisation of one pulse train with another; and FIG. 2 shows an extension of such a device enabling optional synchronisation of one pulse train with a second and vice-versa.

FIG. 1 shows a device according to the invention which, in effect, delays an incident pulse train on a terminal E1 at a bit rate H1. For this pulse train, there is also a "frame" clock pulse Ht1. The pulse train with which the incident pulse train is to be synchronised is characterized by its bit rate H2 and by a frame pulse Ht2, indicating the beginning of each frame.

The incident train arrives simultaneously at all the terminals E1 and the synchronized pulse train leaves the terminals S1 which are all interconnected.

The device is composed of three identical register units 1, 2 and 3 and two identical control circuits 4 and 5. Each register unit is principally constituted by a shift register 6 with a capacity of one complete frame. The input 7 of such a register is connected to the output of a two-input OR gate 8. A first input of this gate is connected to the output of an AND gate 9 one of whose inputs is connected to the terminal E1 of the incident frame. The other input of the OR gate 8 is connected to the output of a two-input AND gate 10, a first of whose inputs is connected to the output 11 of the shift register 6. The terminal S1 is also connected to the output of the gate 10.

The bit rate of the incident pulse train H1 is applied to an AND gate 12, whose output is connected to a two-input OR gate 13. The output of this gate 13 is applied to an input 14 controlling the shift register 6. Each time a pulse reaches the input 14, the contents of the register 6 is shifted one step towards the right.

The bit rate of the outgoing pulse train H2 is applied to a two-input AND gate 15, whose output is applied to the second input of the OR gate 13. The second inputs of the gates 9 and 12 of the three units 1, 2 and 3 are respectively subjected to a control potential $a_1$, $b_1$ or $c_2$ the second inputs of the gates 10 and 15 receive respective control potentials $a_2$, $b_2$, or $c_2$ which are derived from the control circuits 4 and 5, as will be described hereinbelow.

The control circuits 4 and 5 are principally constituted by respective shift registers 16 and 17 each having three flip-flops. These registers are looped and include at each instant only one data "1". Shift pulses are applied to respective inputs 18 and 19 by respective logic circuits 20 and 21 which are activated respectively by the "frame" clock pulses Ht1 and Ht2.

The outputs of the register 16 are referenced $a_1$, $b_1$ and $c_1$ and of the register 17 they are referenced $a_2$, $b_2$, $c_2$. These outputs supply the corresponding control potential for the three register units 1, 2 and 3 so that the letter $a$ relates to the register unit 1, the letter $b$ corresponds to the unit 2 and the letter $c$ corresponds to the unit 3.

The logic circuits 20 and 21 receive, besides the "frame" clock pulse, the control potentials from the two shift registers 16 and 17. They relay a clock pulse to their corresponding shift register provided the following condition is true:

$$a_x \cdot c_y + b_x \cdot a_y + c_x \cdot b_y$$

where $x = 1$ and $y = 2$ for the logic circuit 20 and $x = 2$ and $y = 1$ for the logic circuit 21.

Operation of the device is as follows:

At a given moment, the register 16 shows state 100 and the register 17 shows the state 010. Consequently, the gates 9 and 12 of the first register unit 1 and the gates 10 and 15 of the second register unit 2 are open. The third register unit 3 is non-operative. The common input E1 supplies a frame serially via the gates 9 and 8 to the register 6 of the first unit, under the control of the rate H1, which is applied via the gates 12 and 13 to the input 14 of the register 6 of the first unit. While the register 6 of the first unit is loaded at the incident rate, the register 6 of the second unit 2 is unloaded via the gate 10 and at the rate H2. The rate H2 is applied via the gates 15 and 13 to the input 14 of the register 6 of the second unit.

Let us assume now that the register 6 of the second unit 2 is emptied and that a beginning-of-frame pulse Ht2 is applied, $a_1$ and $b_2$ being at ONE, the logic circuit 21 transmits the clock signal Ht2 to the register 17, which then shows the state 001. As $c_2$ is active, the unit register 3 begins to supply a new frame towards the output S1.

Let it be further assumed that the two pulse trains have the same bit frequency: the appearance of the clock pulse Ht1 is then observed after the switching of the register 17, once the loading of the register 6 of the first unit is ended. Due to the state of the two registers 16 and 17, the logic circuit 20 delivers the clock pulse Ht1 to the input 18 and the new state of the register 16 is 010. Now, the second unit 2 is loaded with the incident train, since the control potential $b_1$ is applied.

Assuming that the frequencies of the two pulse trains are identical, the three registers will therefore be cyclically in the loading state, the rest state and unloading state.

Let us now examine the case where the bit frequency of the incident pulse train, i.e. the rate H1, is lower than the frequency of the outgoing pulse train, i.e. the rate H2. There then comes a moment at which a register unit has just been unloaded while the following unit is still being loaded. In this case, the control circuit 21 blocks the clock pulse Ht2, since the above-mentioned Boolean condition is not fulfilled. This blocking has the effect of keeping the previous state of the register 17 during a new frame period. Correspondingly, the same register unit is unloaded a second time. Due to the looping via gates 10 and 8, the previous frame was still in the register 6 and it is therefore repeated at the output. After this repetition, the conditions for a new switching of the register 17 are probably fulfilled, since meanwhile, it was possible to finish the loading of the register of the previous unit. The cyclic operation is therefore resumed normally.

The case where the frequency H1 of the incident pulse train exceeds the frequency H2 of the outgoing pulse train remains to be discussed. There comes a time when the loading of a register is ended before the unloading of the following register has been completed. Considering the above-mentioned Boolean condition, a pulse Ht1 is omitted by the logic circuit 20 and the following frame is not stored in the following register unit but in the same unit. Indeed, the data contained in this register, i.e. the preceding frame is lost, since this register is not unloaded during this period. After this second successive writing operation in the same unit, the conditions for switching to the following unit are again fulfilled, since it is possible to unload this following register in the meanwhile.

The invention therefore provides very simple means making it possible to deal simultaneously with the problem of conflict between loading and unloading and with positive or negative differences between the frequencies of these two pulse trains.

FIG. 2 shows an extension of the device embodying the invention to the more general case where it is required to have the option of synchronising either a first pulse train with a second, or the second pulse with a first. In this case, two sets 22 and 23 of three register units are provided, such as 1, 2 and 3 in FIG. 1, each set receiving a respective one of the pulse trains on an input E1 or E2. Since synchronisation is never effected in both directions at the same time and since the control circuits 4 and 5 are identical, it is not necessary to duplicate these circuits. The control circuit 4 is, as in the case of FIG. 1, responsible for the cyclic loading of the three registers of the first set 25. It is also responsible for the cyclic unloading of the three registers of the set 23. The control circuit 5 is, as in the case of FIG. 1, responsible for the cyclic unloading of the registers of the set 22. It is also responsible for the cyclic loading of the registers of the set 23. The set 22 adapts the pulse train E1 to the frame clock pulse Ht2 while the set 23 adapts a pulse train E2 whose original "frame" clock pulse is Ht2 to a train whose "frame" clock pulse is Ht1.

The invention is not limited to the examples of embodiments described hereinabove. In particular, the logic structure can be modified by using a negative logic circuit with NAND gates and NOR gates. The shift registers 16 and 17 can also be replaced by a cyclic counter with two flip-flops which counts up to 3. It is also evident that delays can be brought into certain control lines to prevent a false instruction due to transitions in the signals.

Lastly, the invention can be applied in general to a non-binary data pulse train if the registers and the gates are adapted for processing such data.

An application for such a synchronising device is in the construction of a digital echo suppressor in telephone transmission.

What we claim is:

1. A device for synchronising a "frame" of a first data pulse train at a first bit rate to a second data pulse train at a second bit rate, the device comprising a memory, and first and second control circuits for activating respectively the loading of the memory in synchronism with "frame" pulses of the first pulse train, and the unloading of the memory in synchronism with "frame" pulses of the second pulse train; wherein the memory is constituted by three looped shift register units, each having a capacity of one complete frame, and wherein the two control circuits have identical structures and cyclically connect the input of the device to the inputs of the shift registers and likewise cyclically connect the outputs of the shift registers to the output of the device in such a way that each of the control circuits switches from one register unit to the next only if that next unit is not already activated at the switching instant by the other control circuit.

2. A device according to claim 1, wherein the device includes two memories of three looped shift registers each, each memory processing one of the pulse trains and wherein the said first and second control circuits are so arranged that the first control circuit activates the loading of a first one of the memories and the unloading of the other memory and that the second circuit activates the complementary operations, one output signal from each control circuit serving both to switch the loading of one of the memories and the unloading of the other.

3. Apparatus for synchronizing at least one output of a first digital transmission system with the corresponding input of a second digital transmission system, said first and second digital transmission systems each providing a frame synchronizing signal and a bit synchronizing signal, which comprises:
- a first memory circuit comprising at least three looped shift register stages, each of said stages having a capacity which is at least equal to the length of one complete frame of the signal transmitted;
- a first control circuit, connected to the source of the frame synchronizing signal for said first digital transmission system, for loading the output signal from said first transmission system into said first memory circuit in synchronism with said first frame synchronizing signal; and
- a second control circuit, connected to the source of the frame synchronizing signal for said second digital transmission system, for unloading the signal stored in said first memory circuit in synchronism with said second frame synchronizing signal, said first and second control circuits cyclically connecting the output of said first transmission system to the inputs of said shift register stages and the outputs of said shift register stages to the corresponding input of said second transmission system such that each of said control circuits switches from one shift register to the other only if that unit is not already activated at the instant of switching by the other control circuit.

4. The apparatus according to claim 3 wherein each shift register stage includes:
- logic means for looping said shift register only when said shift register is activated for unloading thereof.

5. The apparatus according to claim 3 further comprising:
- a second memory circuit comprising at least three looped shift register stages, each of which has a capacity which is at least equal to the length of one complete frame of the signal transmitted, said first control circuit activating the loading of said first memory circuit and the unloading of said second memory circuit, and said second control circuit activating the loading of said second memory circuit and the unloading of said first memory circuit, one output signal from each control circuit serving both to switch the loading of one of the memory circuits and the unloading of the other.

6. The apparatus according to claim 4 further comprising:
- a second memory circuit comprising at least three looped shift register stages, each of which has a capacity which is at least equal to the length of one complete frame of the signal transmitted, said first control circuit activating the loading of said first memory circuit and the unloading of said second memory circuit, and said second control circuit activating the loading of said second memory circuit and the unloading of said first memory circuit, one output signal from each control circuit serving both to switch the loading of one of the memory circuits and the unloading of the other.

* * * * *